(12) United States Patent
Ito et al.

(10) Patent No.: US 10,552,980 B2
(45) Date of Patent: Feb. 4, 2020

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventors: Hidenori Ito, Kunitachi (JP); Kiwamu Kobayashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 118 days.

(21) Appl. No.: 15/803,532

(22) Filed: Nov. 3, 2017

(65) Prior Publication Data
US 2018/0130232 A1    May 10, 2018

(30) Foreign Application Priority Data

Nov. 9, 2016 (JP) .................................. 2016-218966

(51) Int. Cl.
| | | |
|---|---|---|
| *G06T 7/73* | (2017.01) | |
| *G06T 1/00* | (2006.01) | |
| *G06T 7/194* | (2017.01) | |

(52) U.S. Cl.
CPC ............. *G06T 7/74* (2017.01); *G06T 1/0007* (2013.01); *G06T 7/194* (2017.01); *G06T 2207/20212* (2013.01)

(58) Field of Classification Search
None
See application file for complete search history.

(56) References Cited

U.S. PATENT DOCUMENTS

| | | | | |
|---|---|---|---|---|
| 7,221,794 B1 * | 5/2007 | Gloudemans, II | .... | G06T 15/205 382/154 |
| 8,174,611 B2 * | 5/2012 | Estevez | ................ | H04N 5/2351 348/222.1 |
| 8,873,801 B2 * | 10/2014 | Wang | ........................ | H04N 7/18 382/103 |
| 9,551,922 B1 * | 1/2017 | Liu | ........................ | G03B 35/00 |
| 10,217,195 B1 * | 2/2019 | Agrawal | ................. | G06T 5/003 |

(Continued)

FOREIGN PATENT DOCUMENTS

| | | |
|---|---|---|
| JP | 2003163929 A | 6/2003 |
| JP | 2014215828 A | 11/2014 |

*Primary Examiner* — Iman K Kholdebarin
(74) *Attorney, Agent, or Firm* — Canon U.S.A., Inc. IP Division

(57) ABSTRACT

An image processing apparatus in an image processing system configured to generate a virtual point image using a plurality of images captured by a plurality of image capturing apparatus receives a first difference image being based on a difference between a third image based on image capturing performed by a third image capturing apparatus of the plurality of image capturing apparatuses and a second image based on image capturing performed by a second image capturing apparatus of the plurality of image capturing apparatuses and has a smaller data amount than that of the third image, and acquires a foreground image by extracting a predetermined object from the second image, using the received first difference image and a second difference image between a first image based on image capturing performed by a first image capturing apparatus of the plurality of image capturing apparatus and the second image.

11 Claims, 11 Drawing Sheets

(56) References Cited

U.S. PATENT DOCUMENTS

| | | | | |
|---|---|---|---|---|
| 2007/0223808 A1* | 9/2007 | Kerr | .................... | G06K 9/00771 |
| | | | | 382/159 |
| 2010/0322515 A1* | 12/2010 | Cheng | ................ | G06K 9/00375 |
| | | | | 382/173 |
| 2011/0164823 A1* | 7/2011 | Park | .......................... | G06T 7/12 |
| | | | | 382/199 |
| 2012/0045090 A1* | 2/2012 | Bobbitt | .............. | G06K 9/00771 |
| | | | | 382/103 |
| 2013/0136350 A1* | 5/2013 | Pai | ........................... | G06T 7/11 |
| | | | | 382/165 |
| 2014/0078307 A1* | 3/2014 | Choi | ......................... | G06T 7/20 |
| | | | | 348/155 |
| 2015/0310296 A1* | 10/2015 | Seki | ........................ | G06K 9/46 |
| | | | | 382/195 |
| 2016/0101358 A1* | 4/2016 | Ibrahim | ................. | A63F 13/42 |
| | | | | 463/33 |
| 2018/0130232 A1* | 5/2018 | Ito | ........................... | G06T 7/194 |
| 2018/0295375 A1* | 10/2018 | Ratner | ................. | H04N 19/436 |

* cited by examiner

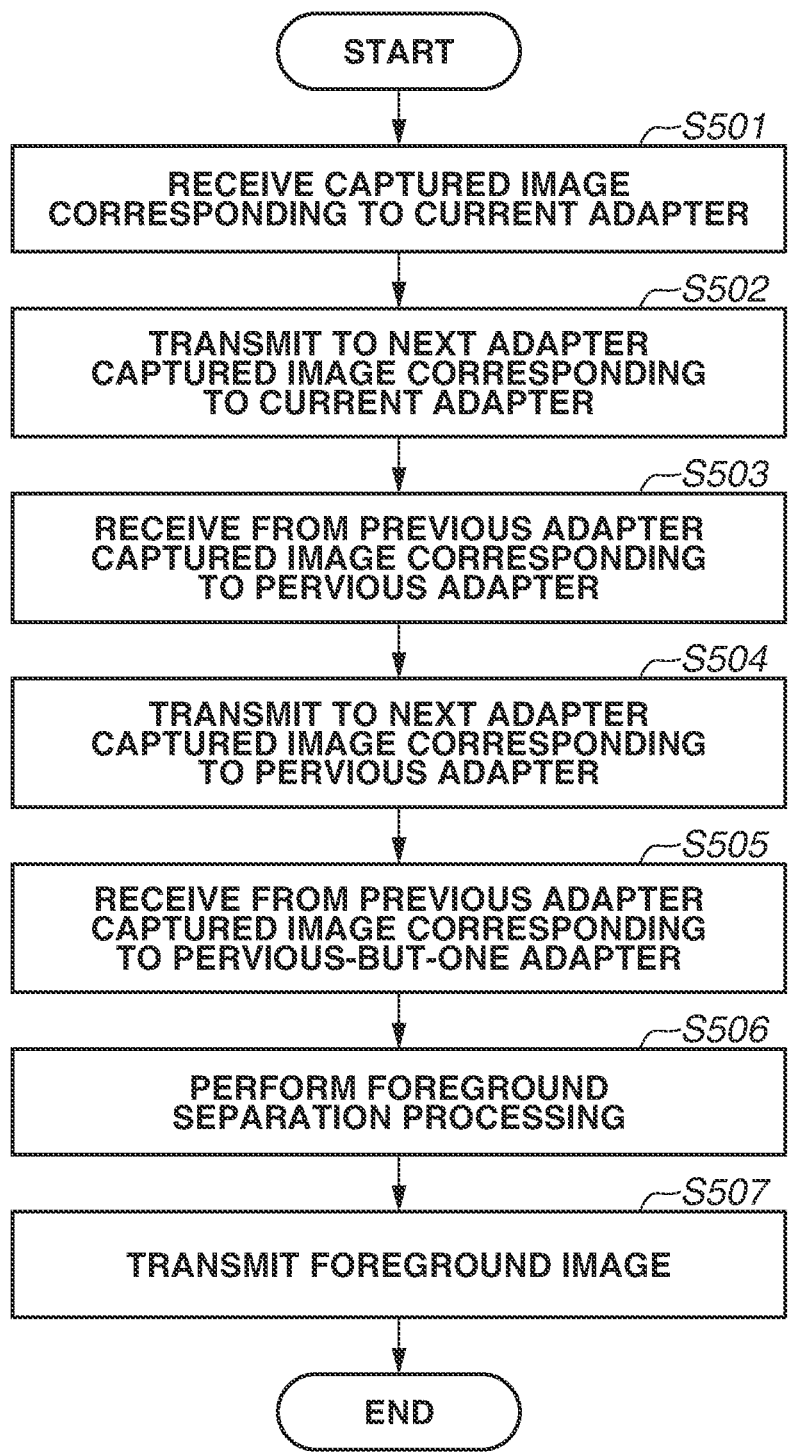

IMAGE PROCESSING APPARATUS, IMAGE PROCESSING METHOD, AND STORAGE MEDIUM

BACKGROUND

Field of the Disclosure

The present disclosure relates to an image processing apparatus, an image processing method, and a storage medium.

Description of the Related Art

In recent years, techniques of generating virtual viewpoint contents using a plurality of viewpoint images that are captured in synchronization from the plurality of viewpoints by a plurality of cameras situated in different positions have been drawing attention. The techniques of generating virtual viewpoint contents from a plurality of viewpoint images enable users to watch, for example, highlight scenes of soccer games from various angles. Japanese Patent Application Laid-Open No. 2014-215828 discusses a technique of generating and displaying desired virtual viewpoint images using images of an area that are captured by a plurality of cameras arranged to surround the area.

However, when a plurality of captured viewpoint images is gathered in an image processing apparatus such as a server to generate virtual viewpoint images, there arises a problem that a large amount of data of the captured images needs to be transmitted. For example, even in a case in which a server and a plurality of cameras are daisy-chain connected, if the server is configured to receive all images captured by the cameras, a large amount of data of captured images needs to be transmitted. Transmission of a large amount of data puts a load on communication paths and increases a load of reception processing performed by the server. While the problem that arises in the case of generating virtual viewpoint images using images captured by a plurality of cameras is described above, a similar problem can arise also in a case of generating virtual viewpoint contents containing virtual viewpoint audio using sound pickup data acquired by a plurality of microphones.

SUMMARY

According to one or more aspects of the present disclosure, an image processing apparatus in an image processing system configured to generate a virtual viewpoint image using a plurality of images captured by a plurality of image capturing apparatuses includes a first acquisition unit configured to acquire a first image based on image capturing performed by a first image capturing apparatus among the plurality of image capturing apparatuses, a first reception unit configured to receive a second image based on image capturing performed by a second image capturing apparatus among the plurality of image capturing apparatuses, a second reception unit configured to receive a first difference image which is a difference image based on a difference between the second image and a third image based on image capturing performed by a third image capturing apparatus among the plurality of image capturing apparatuses and has a smaller data amount than a data amount of the third image, and a second acquisition unit configured to acquire a foreground image using the first difference image and a second difference image which is a difference image of the first image and the second image, the foreground image being an image generated by extracting a predetermined object from the second image.

Further features of the present disclosure will become apparent from the following description of exemplary embodiments with reference to the attached drawings.

BRIEF DESCRIPTION OF THE DRAWINGS

FIG. 5 is a flow chart illustrating a process performed by adapters according to one or more aspects of the present disclosure.

DESCRIPTION OF THE EMBODIMENTS

Various exemplary embodiments of the present disclosure will be described below with reference to the drawings. In the exemplary embodiments described below, techniques for reducing the amount of data transmitted between apparatuses in a system configured to generate virtual viewpoint contents using a plurality of captured viewpoint images will be described.

Figure 1:
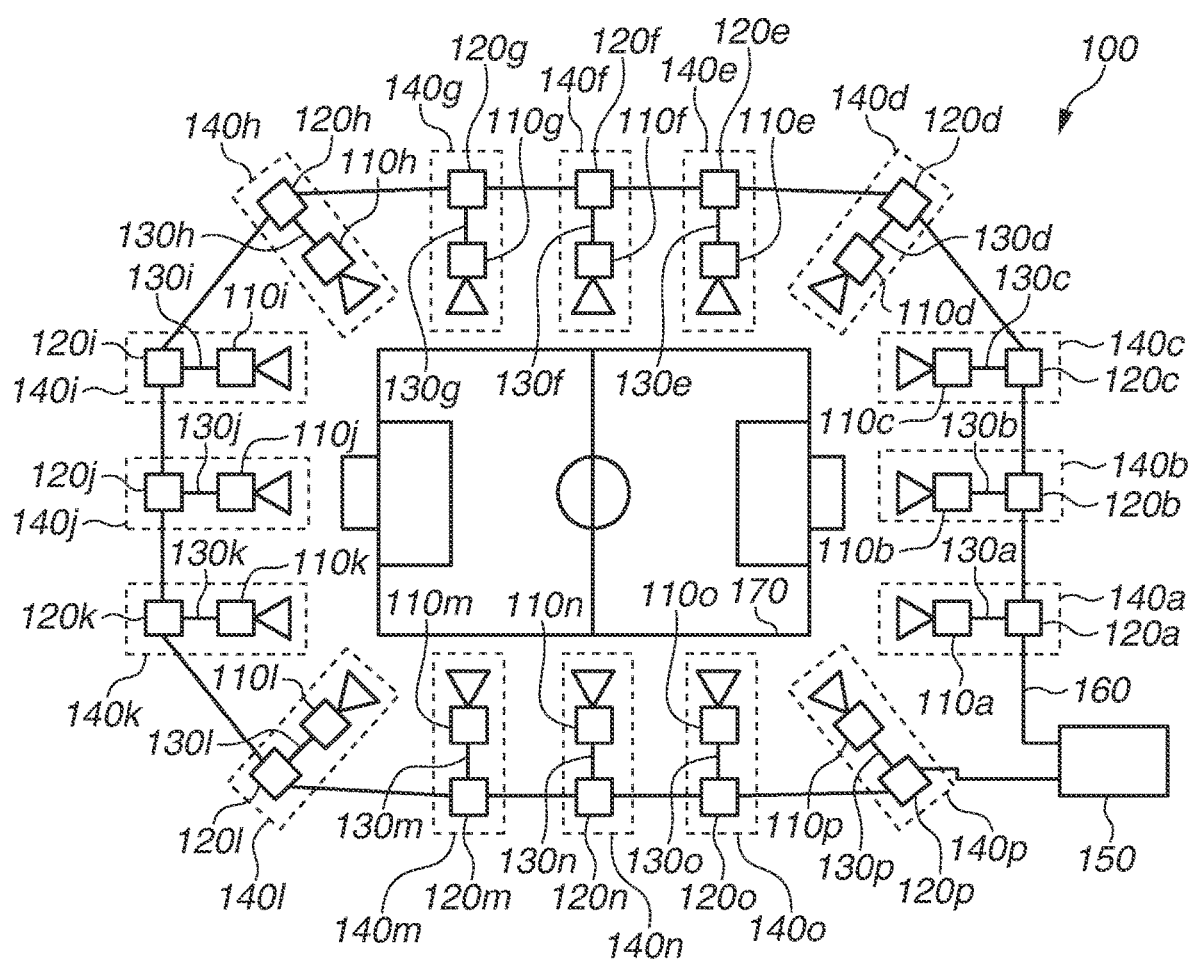
FIG. 1 illustrates an entire image processing system according to one or more aspects of the present disclosure.

FIG. 1 illustrates an entire image processing system 100 according to one or more aspects of the present disclosure. The image processing system 100 includes a plurality of cameras 110a to 110p, adapters 120a to 120p, and a server apparatus 150. The plurality of cameras 110a to 110p is arranged to surround an image-capturing target 170. The adapters 120a to 120p are respectively connected to the cameras 110a to 110p. The cameras 110a to 110p are an example of image capturing apparatuses. Further, the adapters 120a to 120p are an example of image processing apparatuses provided to respectively correspond to the cameras 110a to 110p. The cameras 110a to 110p are connected to the corresponding adapters 120a to 120p via transmission cables 130a to 130p, respectively. The transmission cables 130a to 130p are realized by, for example, serial digital interface (SDI) cables. The adapters 120a to 120p are daisy-chain connected via a transmission cable 160. Further, the server apparatus 150 is connected to the adapters 120a and 120p via the transmission cable 160. The transmission cable 160 is realized by, for example, an Ethernet cable.

A unit formed by the camera 110a, the adapter 120a, and the transmission cable 130a will be referred to as a sensor system 140a. Similarly, units respectively formed by the cameras 110b to 110p, the adapters 120b to 120p, and the transmission cables 130b to 130p will be referred to as sensor systems 140b to 140p, respectively. In the image processing system 100, the plurality of sensor systems 140a to 140p situated around the image-capturing target 170 captures images of the image-capturing target 170 from all directions, and image processing is performed on the captured image group so that video images of desired viewpoints are reconfigured and provided to a user. The video image reconfiguration processing is performed by the adapters 120a to 120p and the server apparatus 150. The image processing system 100 needs to include a plurality of sensor systems, but the number of sensor systems in the image processing system 100 is not limited to the number specified in the present exemplary embodiment. Further, the cameras 110a to 110p are similar devices, and unless distinction among the cameras 110a to 110p is necessarily made, the cameras 110a to 110p will be referred to simply as "the camera 110". Similarly, the adapters 120a to 120p are similar devices, and unless distinction among the adapters 120a to 120p is necessarily made, the adapters 120a to 120p will be referred to simply as "the adapter 120".

While various methods are applicable to the video image reconfiguration processing, the present exemplary embodiment employs the following method. The adapter 120 separates a foreground image in the image-capturing target 170 using an image captured by the camera 110 that corresponds to the adapter 120 and images respectively captured by the cameras 110 that are located next to the camera 110 that corresponds to the adapter 120, and the adapter 120 performs processing to transmit the separated foreground image to the server apparatus 150. The server apparatus 150 performs video image reconfiguration processing to reconfigure a video image of a desired viewpoint using the foreground images that are captured from the respective image capturing positions of the cameras 110 and transmitted from the adapters 120.

To perform the above-described processing, the image processing system 100 is configured such that the adapters 120 of the sensor systems 140 situated around the image-capturing target 170 are daisy-chain connected by the transmission cable 160. The adapters 120 transmit necessary data for separating the foreground images from the images captured by the cameras 110, and transmit the foreground images extracted from the images captured by the cameras 110.

Figure 2:
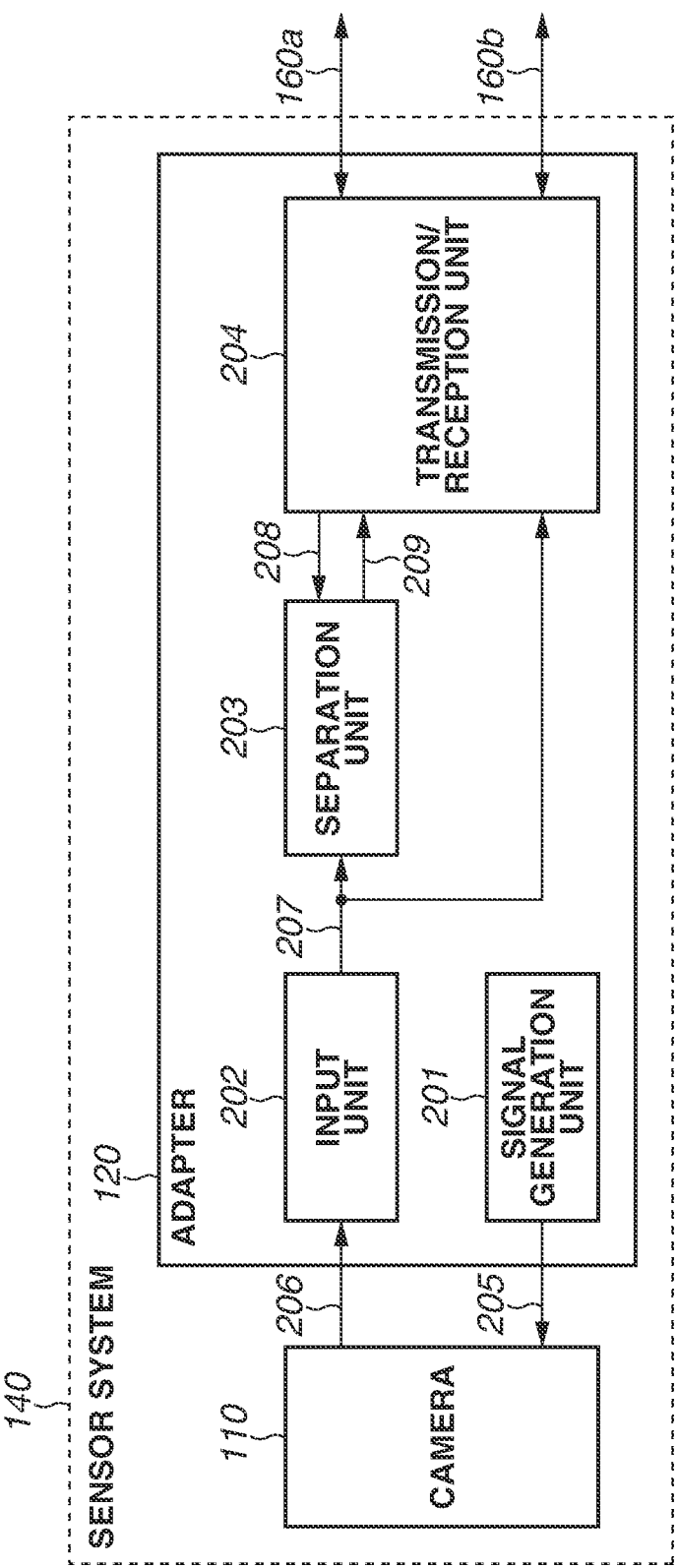
FIG. 2 illustrates a configuration of an adapter according to one or more aspects of the present disclosure.

FIG. 2 illustrates the configuration of the adapter 120 in the sensor system 140 according to one or more aspects of the present disclosure. The adapter 120 outputs to the camera 110 a synchronization signal 205 for image capturing, and the camera 110 captures an image in synchronization with the input synchronization signal 205 and outputs a captured image 206 to the adapter 120. The adapter 120 transmits and receives data to and from the adjacent adapters 120 via the transmission cables 160a and 160b.

A signal generation unit 201 generates the synchronization signal 205 which is output to the camera 110. The synchronization signal 205 includes an image capturing timing and a timestamp. The image capturing timing is generated to cause all the cameras 110 of the image processing system 100 to capture images in synchronization. The signal generation unit 201, for example, synchronizes all the adapters 120 according to the Precision Time Protocol (PTP) to generate the image capturing timing at the same time. The same timestamp is given to the image capturing timings that are generated at the same time in the adapters 120. In this way, images captured by the plurality of cameras 110 at the same timing are given the same timestamp. To give the timestamps, a time code is used. Examples of such a time code include Linear Time Code (LTC) defined in the Society of Motion Picture and Television Engineers (SMPTE) 12M specification.

The camera 110 performs image capturing processing using the synchronization signal 205 and outputs the captured image 206 to the adapter 120. An input unit 202 receives the captured image 206 from the camera 110 and outputs the received image 206 as a captured image 207 to a separation unit 203 and a transmission/reception unit 204. The separation unit 203 performs foreground separation processing using the captured image 207 and transmission data 208 transmitted from the other sensor systems 140. Then, the separation unit 203 outputs the processing result as transmission data 209 to the transmission/reception unit 204. The data transmitted and received by the separation unit 203 and the foreground separation processing performed by the separation unit 203 will be described below.

The transmission/reception unit 204 performs processing to transmit to the other sensor systems 140 the data received from the input unit 202 and the data received from the separation unit 203, and performs processing to transmit to the separation unit 203 the data received from the other sensor systems 140. The data transmission and reception are performed via the transmission cable 160a or 160b connected to a transmission destination and a reception destination. The data transmitted and received by the transmission/reception unit 204 will also be described below together with the foreground separation processing.

Figure 11:
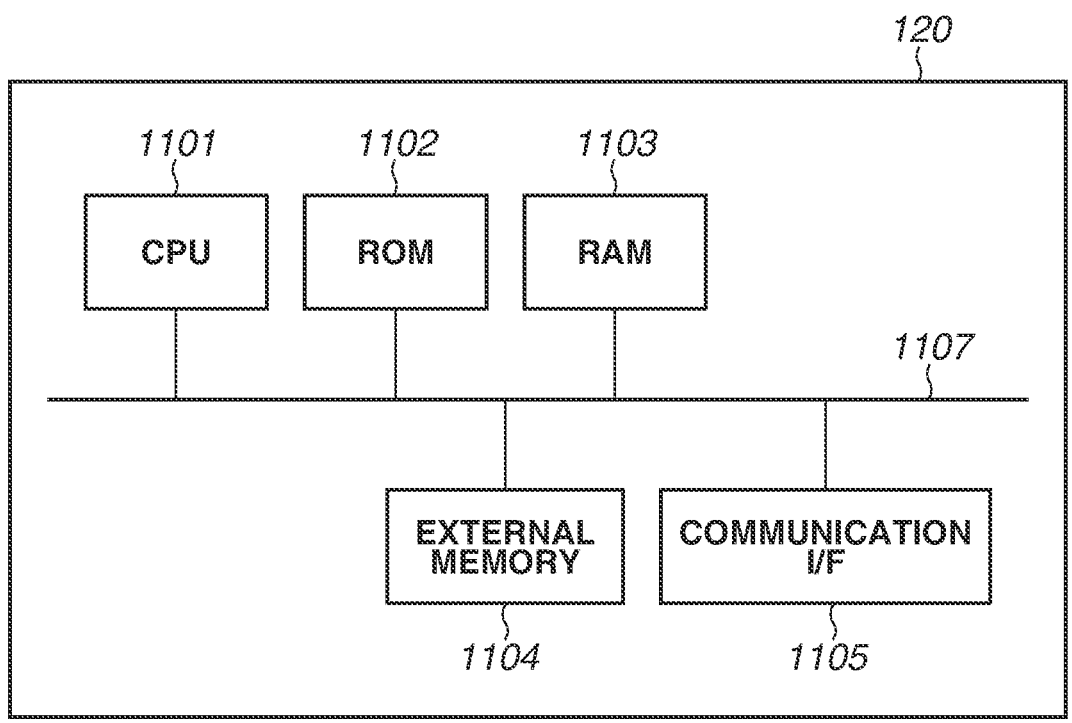
FIG. 11 illustrates an example of the hardware configuration of an adapter according to one or more aspects of the present disclosure.

According to the present exemplary embodiment, each unit of the adapter 120 illustrated in FIG. 2 is realized by hardware. Alternatively, each unit illustrated in FIG. 2 can be realized by software. In this case, the adapter 120 includes a central processing unit (CPU), a random-access memory (RAM), and a read-only memory (ROM), and the CPU reads and executes a program stored in the ROM to realize each unit illustrated in FIG. 2. FIG. 11 illustrates the hardware configuration of the adapter 120 in the case in which the adapter 120 executes processing according to the present exemplary embodiment using hardware such as a CPU. As illustrated in FIG. 11, the adapter 120 can employ a hardware configuration including a CPU 1101, a ROM 1102, a RAM 1103, an external memory 1104, and a communication interface 1105 all of which are connected to a communication bus 1107. In this case, the CPU 1101 reads a predetermined program from the ROM 1102 and executes the read program to realize the processing performed by the signal generation unit 201, the input unit 202, the separation unit 203, and the transmission/reception unit 204 illustrated in FIG. 2. Further, the CPU 1101 causes the communication interface 1105 to operate to realize communication between the adapter 120 and the camera 110 and communication between the adapter 120 and another adapter 120.

Figure 3:
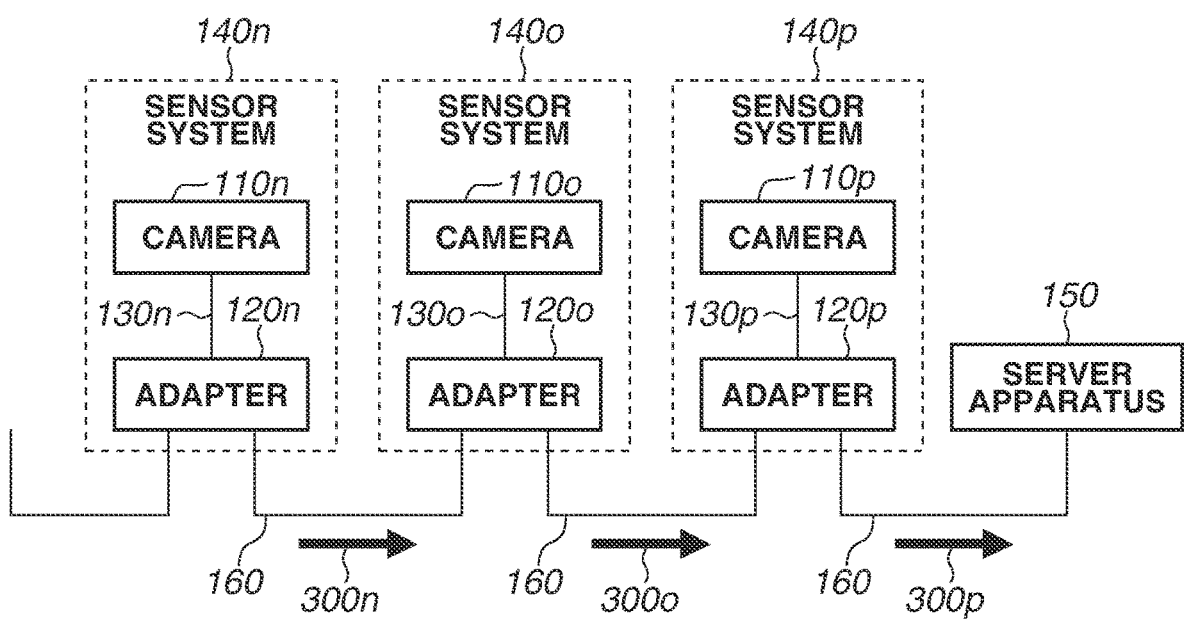
FIG. 3 illustrates a flow of data among apparatuses according to one or more aspects of the present disclosure.

FIG. 3 illustrates the flow of data between the sensor systems 140 and the flow of data between the sensor systems 140 and the server apparatus 150 according to one or more aspects of the present disclosure. The flow of data among the plurality of sensor systems 140n, 140o, and 140p and the server apparatus 150 will be described below with reference to FIG. 3. In the image processing system 100, necessary data for the foreground separation processing is transmitted from the farthest to closest adapters 120 in descending order of distance from the server apparatus 150.

In the example illustrated in FIG. 3, the adapter 120n transmits transmission data 300n to the adapter 120o via the transmission cable 160. The adapter 120o transmits transmission data 300o to the adapter 120p via the transmission cable 160. The adapter 120p transmits transmission data 300p to the server apparatus 150 via the transmission cable 160. Each transmission data contains a foreground image, which is a result of the separation of a foreground area from an image captured by the camera 110, and necessary data for the foreground separation processing for extracting the foreground image. The necessary data for the foreground separation processing will be described below together with the foreground separation processing.

Figure 4A:
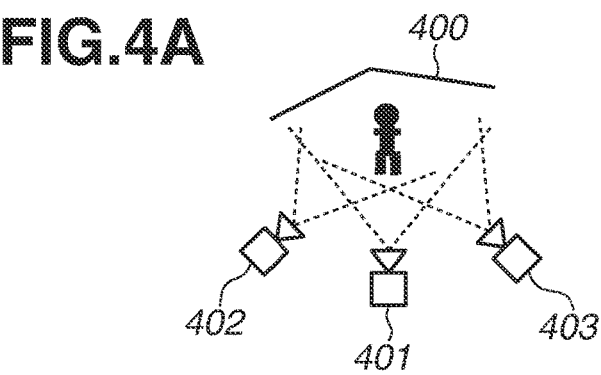
FIGS. 4A, 4B, and 4C illustrate foreground separation processing according to one or more aspects of the present disclosure.
Figure 4B:
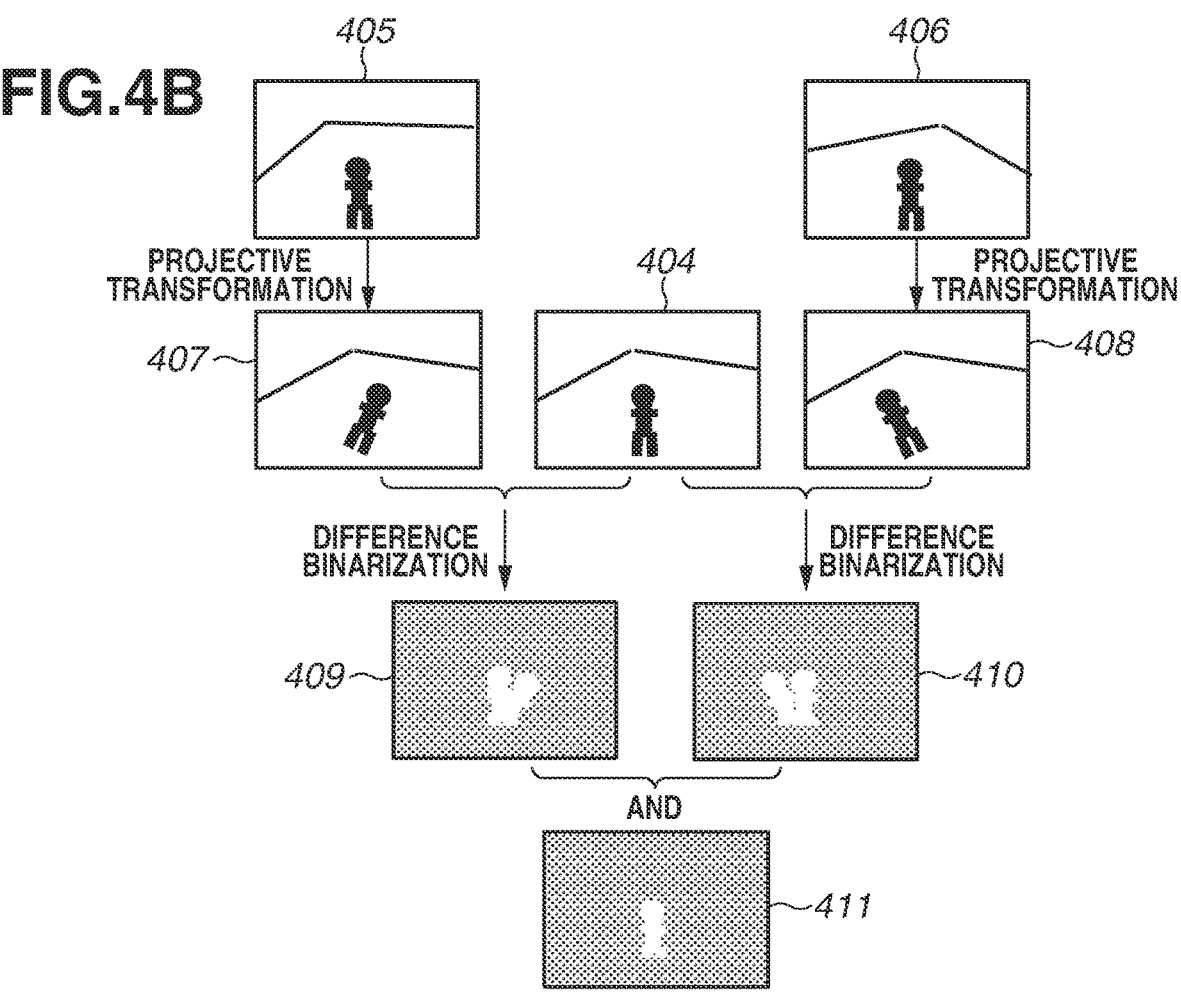
Figure 4C:
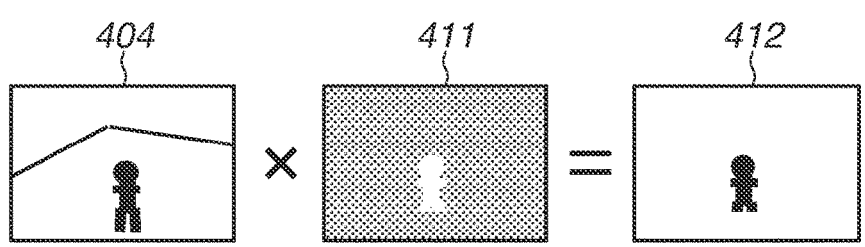

FIGS. 4A to 4C illustrate the foreground separation processing performed by the separation unit 203 according to one or more aspects of the present disclosure. A case in which a foreground image is separated using images captured by three cameras 401 to 403 will be described below as an example. FIG. 4A illustrates an example of an arrangement of a subject 400 and the cameras 401 to 403. The cameras 401 to 403 capture images of the subject 400 from different directions. Further, in the case of capturing images in the arrangement, the foreground separation processing is performed on an image captured by the camera 401. In other words, an image captured by the camera (camera 401) determined as a camera to capture images on which the foreground separation processing is to be performed and images captured by the cameras (cameras 402 and 403) that are located next to the camera (camera 401) are used in the foreground separation processing.

FIG. 4B illustrates a process of generating, from the images captured by the three cameras 401 to 403, a foreground mask for a captured image on which the foreground separation processing is to be performed. In the processing, a captured image 404 captured by the camera 401, a captured image 405 captured by the camera 402, and a captured image 406 captured by the camera 403 are used. First, the separation unit 203 performs projective transformation on the captured image 405 captured by the camera 402 and the captured image 406 captured by the camera 403 such that reference planes in the captured images 405 and 406 overlap a reference plane in the captured image 404 captured by the camera 401. As used herein, the term "reference plane" refers to a plane where an image-capturing target object is located. For example, if an image-capturing target is a soccer game, the image-capturing target object is a player, and the plane is a soccer field. The image-capturing target is not limited to the soccer games, and the image-capturing target object and the reference plane are determined according to the image-capturing target.

Next, the separation unit 203 generates a difference image 409 between the captured image 404 captured by the camera 401 and a captured image 407 which is captured by the camera 402 and has undergone the projective transformation. The term "difference image" refers to a binary image generated by comparing two images on a pixel-by-pixel basis and setting a 1-bit flag with respect to the pixels that have a difference. As to the data size of the difference image 409, the number of pixels is the same as that of the captured image 404 or 407, and the bit depth of each pixel is "1/(bit depth of one pixel of a captured image)" with respect to the captured images. Thus, the data size of the difference image 409 is "1/(bit depth of one pixel of the captured image)" with respect to the data size of the captured image 404 or 407. For example, in a case in which original images are images each having 8-bit data for each of red, green, and blue (RGB) per pixel, the size of the difference image 409 is 1/24 of the data size of the original image. Similarly, the separation unit 203 generates a difference image 410 between the captured image 404 captured by the camera 401 and a captured image 408 which is captured by the camera 403 and has undergone the projective transformation. The difference image 410 indicates a foreground candidate region in the captured image 404 captured by the camera 401.

Next, the separation unit 203 generates a mask image 411 from the difference images 409 and 410. In this processing, the separation unit 203 compares the two difference images 409 and 410 on a pixel-by-pixel basis and sets a 1-bit flag with respect to the pixels to which a flag is set in both difference images 409 and 410. Consequently, the mask image 411 indicating the pixels of captured contents other than the reference plane in the captured image 404 captured by the camera 401 is obtained through the above processing. The region indicated by the mask image 411 is the foreground region in the captured image 404 captured by the camera 401.

FIG. 4C illustrates a process of generating a foreground image 412 for the camera 401 from the captured image 404 captured by the camera 401 and the mask image 411. The separation unit 203 generates the foreground image 412 for the camera 401 by extracting, from the captured image 404, the pixels to which a flag is set in the mask image 411.

Next, a process performed by the adapter 120 in the case in which one adapter 120 performs the entire foreground separation processing described above with reference to FIGS. 4A to 4C will be described first with reference to FIGS. 5 to 7. Then, a process performed by a plurality of adapters 120 in the case in which the plurality of adapters 120 performs the separation processing will be described next with reference to FIGS. 8 to 10. The description of the former process is given for a comparison to the latter process.

Figure 6A:
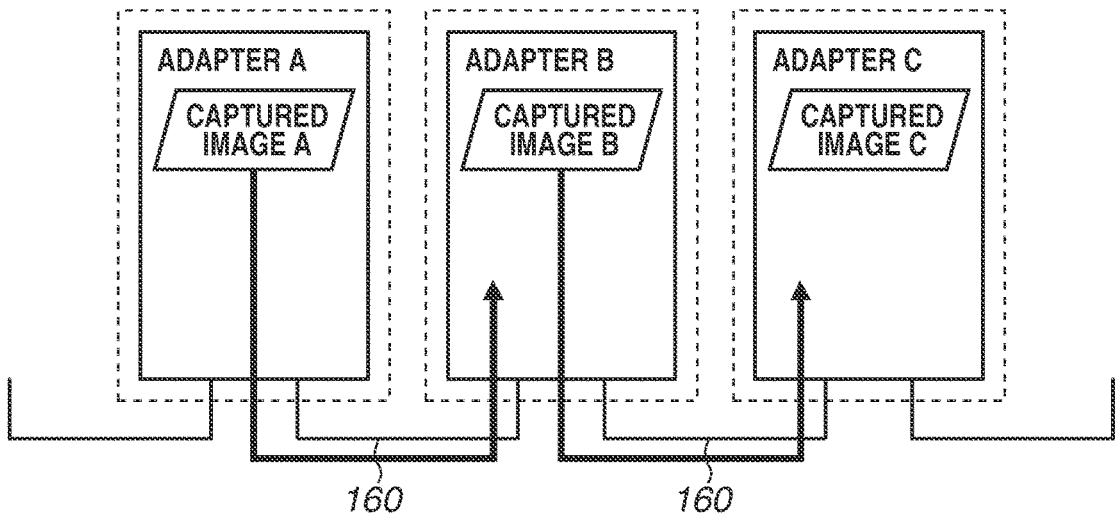
FIGS. 6A, 6B, and 6C illustrate a flow of data among adapters according to one or more aspects of the present disclosure.
Figure 6B:
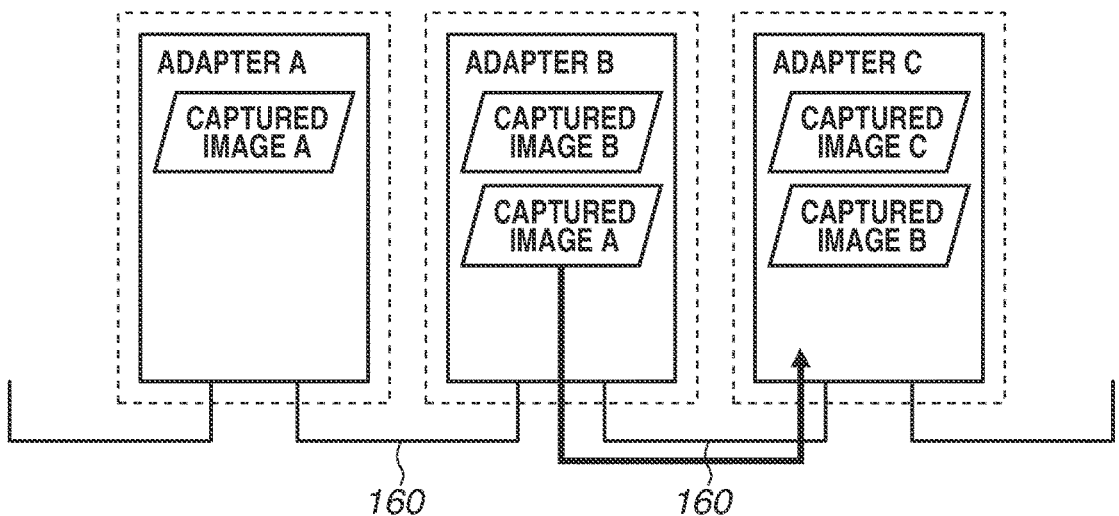
Figure 6C:
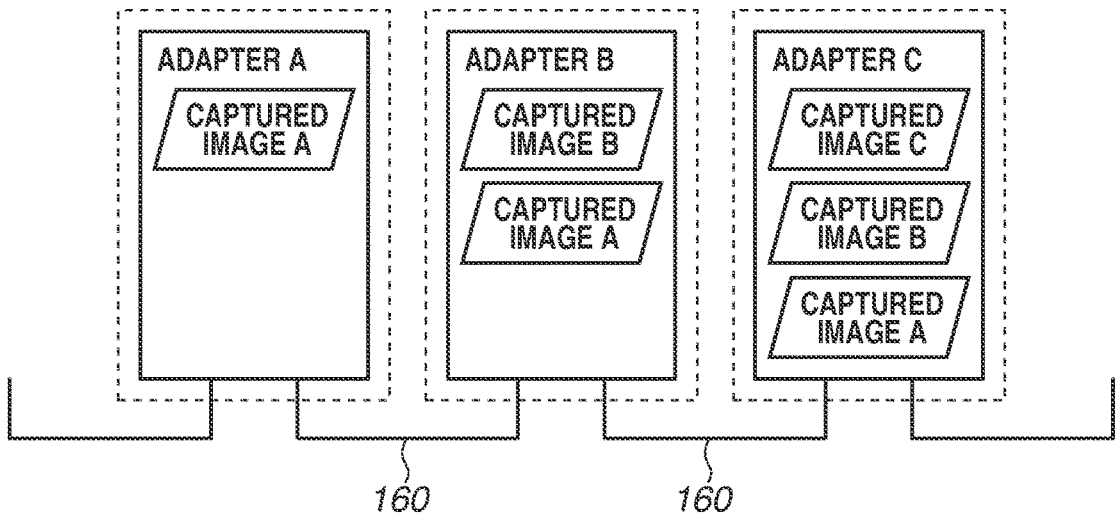

FIG. 5 is a flow chart illustrating the processing of one frame which is performed by the adapter 120 according to one or more aspects of the present disclosure. Further, FIGS. 6A to 6C illustrate the flow of data among three adapters 120 (adapters A to C) according to one or more aspects of the present disclosure. The foreground separation processing of one frame which is performed by the adapter 120 will be described below with reference to FIGS. 5 and 6A to 6C.

In step S501, the input unit 202 acquires (receives) an image captured by the camera 110 connected to the input unit 202 by the transmission cable 130, i.e., the camera 110 corresponding to the current adapter 120, from the corresponding camera 110. Next, in step S502, the transmission/reception unit 204 transmits to the adjacent adapter 120 via the transmission cable 160 the image captured by the corresponding camera 110. According to the present exemplary embodiment, the captured image is transmitted to the next adapter 120 on the daisy-chain configuration. In the example illustrated in FIGS. 6A to 6C, the adapter A transmits to the next adapter B a captured image A captured by the camera corresponding to the adapter A through the above-described processing as illustrated in FIG. 6A. Similarly, the adapter B transmits to the adapter C a captured image B captured by the camera corresponding to the adapter B.

Next, in step S503, the transmission/reception unit 204 receives a captured image which is captured by the camera 110 corresponding to the previous adapter 120 and transmitted from the previous adapter 120. The adapter B receives the captured image A from the previous adapter A through the above-described processing as illustrated in FIG. 6A. Similarly, the adapter C receives the captured image B from the adapter B. Next, in step S504, the transmission/reception unit 204 transmits to the next adapter 120 the captured image received from and corresponding to the previous adapter 120. In the example illustrated in FIG. 6B, the adapter B transmits to the next adapter C the captured image A corresponding to the previous adapter A.

Next, in step S505, the transmission/reception unit 204 receives the captured image which is captured by the camera 110 corresponding to the adapter 120 before the previous adapter 120 and transmitted from the previous adapter 120. At this time, the previous adapter 120 has already received, from the adapter 120 before the previous adapter 120, the captured image corresponding to the previous-but-one adapter 120. FIG. 6C illustrates the captured images held by the adapters A to C when the processing performed in step S505 is completed. The adapter C holds the captured images B and A in addition to the captured image C.

Next, in step S506, the separation unit 203 performs the foreground separation processing. In the example illustrated in FIGS. 6A to 6C, the adapter C generates a difference image between the captured images C and B and a difference image between the captured images A and B. Further, the separation unit 203 generates a foreground image with respect to the captured image B based on the two difference images. Next, in step S507, the transmission/reception unit 204 transmits, to the server apparatus 150 via the transmission cable 160, the foreground image acquired through the foreground separation processing. Then, the processing of extracting the foreground image of one frame is ended.

Figure 7:
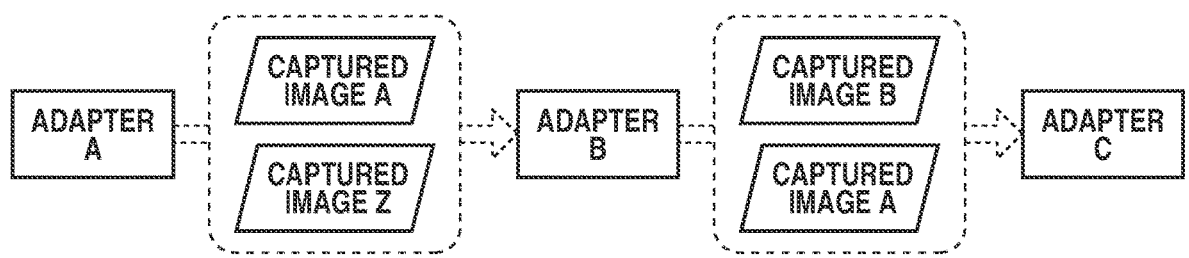
FIG. 7 illustrates transmission and reception of data among adapters according to one or more aspects of the present disclosure.

FIG. 7 illustrates the transmission and reception of the captured images among the adapters 120 that corresponds to the process illustrated in FIG. 5. From the adapter A to the adapter B, two captured images, the captured image A corresponding to the adapter A and a captured image Z corresponding to an adapter (previous adapter) located immediately next to the adapter A on the upstream side, are transmitted. Similarly, from the adapter B to the adapter C, the captured image B acquired by the camera corresponding to the adapter B and the captured image A corresponding to the adapter A are transmitted. As described above, in the case of performing the processing illustrated in FIGS. 4A to 4C, two captured images are transmitted between the adapters as data for use in the foreground separation processing.

Figure 8:
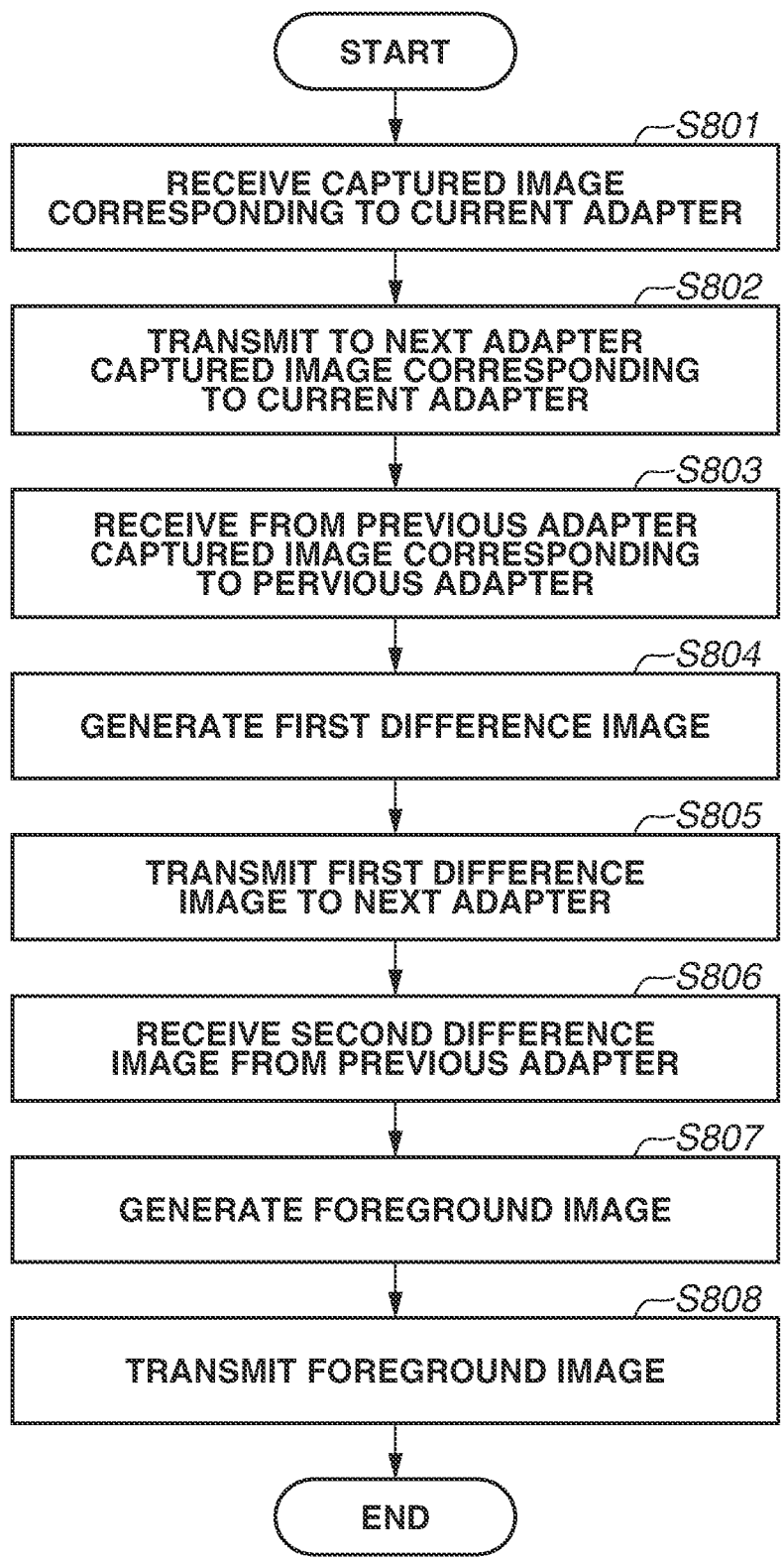
FIG. 8 is a flow chart illustrating a process performed by adapters according to one or more aspects of the present disclosure.
Figure 9A:
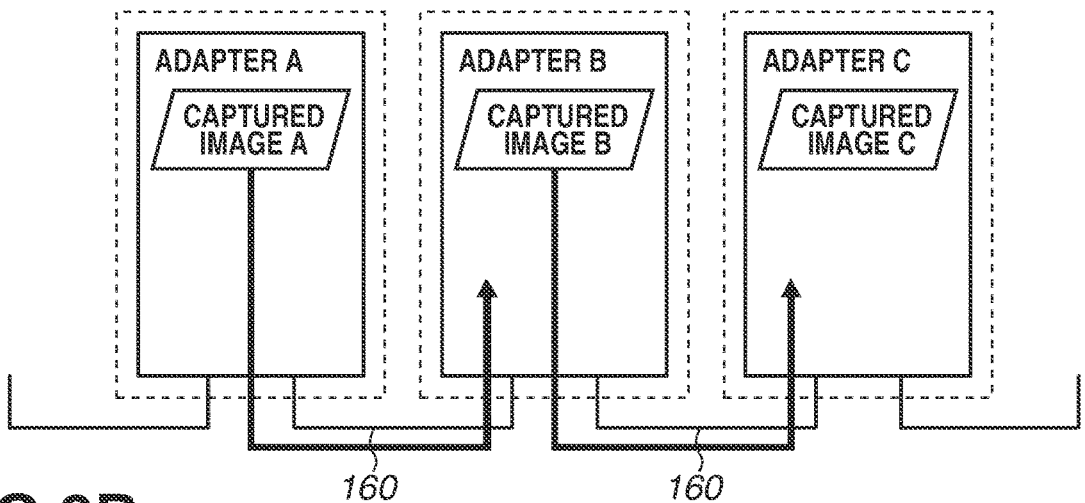
FIGS. 9A, 9B, and 9C illustrate a flow of data among adapters according to one or more aspects of the present disclosure.
Figure 9B:
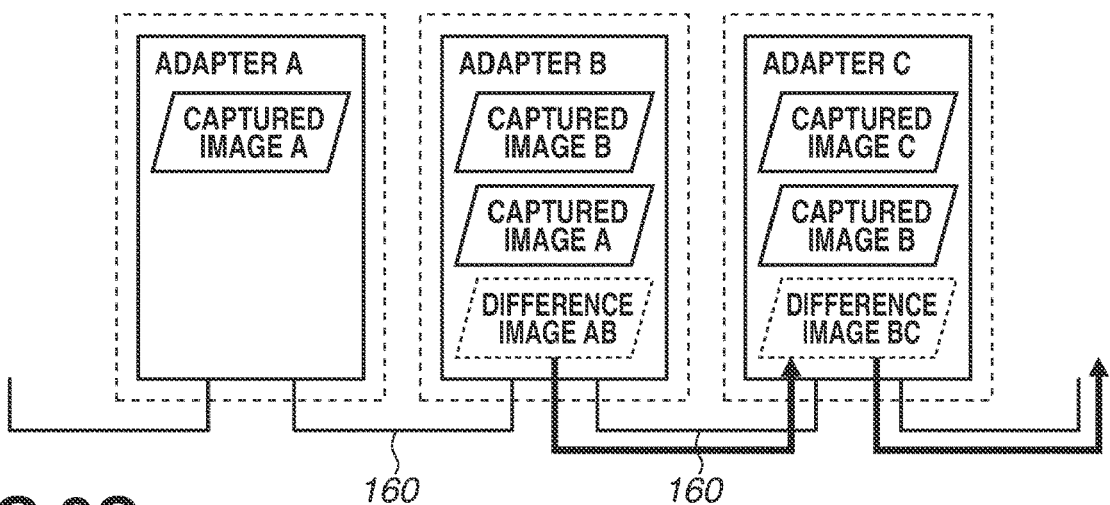
Figure 9C:
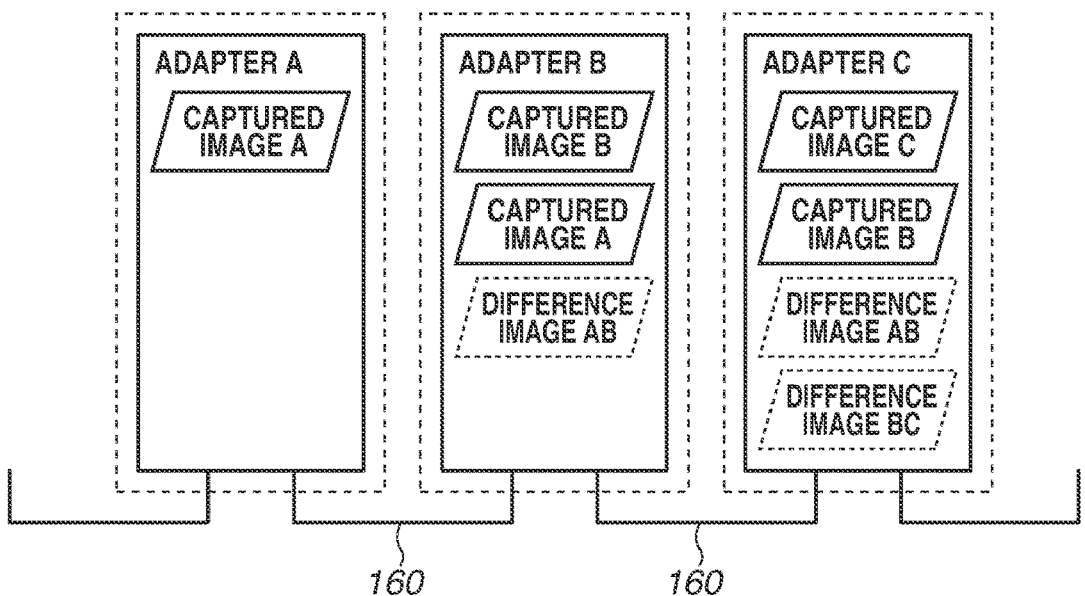

Next, the foreground separation processing performed by the plurality of adapters 120 will be described below with reference to FIGS. 8 to 10. FIG. 8 is a flow chart illustrating the processing of one frame which is performed by the adapters 120 according to one or more aspects of the present disclosure. Further, FIGS. 9A to 9C illustrate the flow of data among three adapters 120 (adapters A to C). The following describes the foreground separation processing of one frame which is performed by the adapters 120, with reference to FIGS. 8 and 9A to 9C.

In step S801, the input unit 202 acquires (receives) a captured image acquired by the camera 110 corresponding to the current adapter 120 from the corresponding camera 110. Next, in step S802, the transmission/reception unit 204 transmits, to the next adapter 120 via the transmission cable 160, the captured image corresponding to the current adapter 120. In the example illustrated in FIGS. 9A to 9C, the adapter A transmits to the next adapter B a captured image A captured by the camera corresponding to the adapter A as illustrated in FIG. 9A. Similarly, the adapter B transmits to the adapter C a captured image B captured by the camera corresponding to the adapter B.

Next, in step S803, the transmission/reception unit 204 receives a captured image which is captured by the camera 110 corresponding to the previous adapter 120 and transmitted from the previous adapter 120. As illustrated in FIG. 9A, the adapter B receives the captured image A from the previous adapter A through the above-described processing. Similarly, the adapter C receives the captured image B from the adapter B. The processing in steps 5801 to S803 is similar to that in steps S501 to S503 described above with reference to FIG. 5.

Next, in step S804, the separation unit 203 generates a difference image between the captured image corresponding to the current adapter 120 and the captured image corresponding to the previous adapter 120. The difference image is an example of a processing image for use in generating a foreground image of the captured image corresponding to the previous adapter 120. Hereinafter, the difference image generated in step S804 will be referred to as "first difference image". Next, in step S805, the separation unit 203 transmits the first difference image to the next adapter 120. In the example illustrated in FIGS. 9A to 9C, the adapter B generates a difference image AB as the first difference image from the captured images A and B as illustrated in FIG. 9B. Then, the adapter B transmits the difference image AB to the adapter C. As illustrated in FIG. 9B, the adapter C generates a difference image BC as the first difference image from the captured images B and C. Then, the adapter C transmits the difference image BC to an adapter D (not illustrated). In a case in which the adapter C is connected to not the adapter D but the server apparatus 150, the adapter C transmits the difference image BC to the server apparatus 150.

Next, in step S806, the transmission/reception unit 204 receives a difference image generated by and transmitted from the previous adapter 120. The received difference image is an example of a processing image for use in generating a foreground image of the captured image corresponding to the previous adapter 120. Hereinafter, the difference image received in step S806 will be referred to as "second difference image". In the example illustrated in FIGS. 9A to 9C, the adapter C receives from the adapter B the difference image AB generated from the captured images A and B as illustrated in FIG. 9B. FIG. 9C illustrates the captured images and the difference images held by the adapters A to C when the processing performed in step S806 is completed. The adapter C holds the captured image C captured by the camera 110 corresponding to the adapter C and the captured image B corresponding to the adapter B. The adapter C further holds the difference image BC, which is generated from the captured images B and C as the first difference image in step S805, and the difference image AB received as the second difference image from the adapter B in step S806.

Next, in step S807, the separation unit 203 generates a foreground image of the captured image corresponding to the previous adapter 120 based on the first and second difference images. In the example illustrated in FIGS. 9A to 9C, the adapter C generates a foreground image of the captured image (captured image B) corresponding to the adapter B based on the first difference image (difference image BC) and the second difference image (difference image AB) as illustrated in FIG. 9C. Next, in step S808, the transmission/reception unit 204 transmits the generated foreground image to the server apparatus 150 via the transmission cable 160. According to the present exemplary embodiment, in a case in which another adapter 120 is connected between the adapter 120 and the server apparatus 150, the foreground image is transmitted to the server apparatus 150 via the other adapter 120. Description of the processing of extracting the foreground image of one frame ends.

Figure 10:
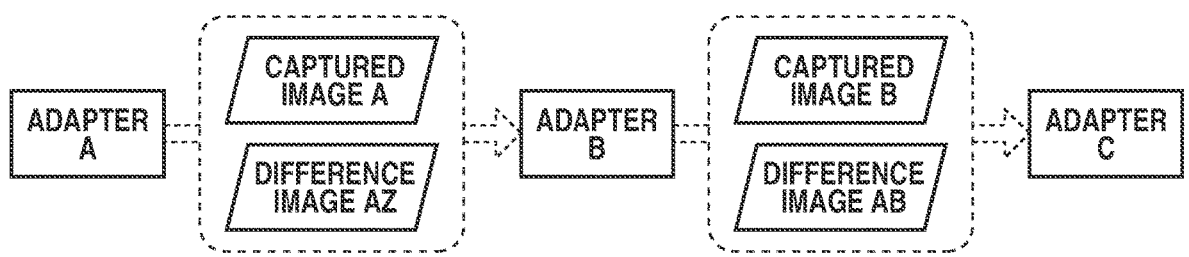
FIG. 10 illustrates transmission and reception of data among adapters according to one or more aspects of the present disclosure.

FIG. 10 illustrates the transmission and reception of the captured images and the difference images among the adapters 120 that corresponds to the process illustrated in FIG. 8. From the adapter A to the adapter B, two images that are the captured image A corresponding to the adapter A and a difference image AZ, which is a difference image between the captured image A corresponding to the adapter A and the captured image Z corresponding to the adapter located immediately next to the adapter A on the upstream side, are transmitted. Similarly, from the adapter B to the adapter C, two images that are the captured image B corresponding to the adapter B and the difference image AB between the captured image B corresponding to the adapter B and the captured image A corresponding to the adapter A, are transmitted.

While two captured images are the data transmitted and received between the adapters 120 in the example illustrated in FIG. 7, one captured image and one difference image are the data transmitted and received between the adapters 120 in the example illustrated in FIG. 10. As described above, the data size of the difference image is "1/(bit depth of one pixel of a captured image)" with respect to the data size of the captured image. In other words, in the image processing system 100 according to the present exemplary embodiment, each of the adapters 120 performs the processing as illustrated in FIG. 7 to reduce the amount of data transmitted between the adapters 120. In other words, the amount of data transmitted between the adapters (between the apparatuses) is reduced in the system configured to perform processing using captured images of a plurality of viewpoints.

The processing images according to the present exemplary embodiment are not limited to the binary difference images described as an example in the above-described exemplary embodiment and can be any image that has a smaller data amount than the data amounts of captured images and is to be used to generate a foreground image. Alternatively, the processing images can be a multi-valued difference image having a lower gradation level than the gradation levels of the captured images.

While an exemplary embodiment of the present disclosure is described in detail above, it should be noted that the scope of the disclosure is not limited to any specific exemplary embodiment, and various modifications and changes can be made within the spirit of the claimed disclosure.

For example, while the case in which the camera 110 and the adapter 120 are separate devices is mainly described in the present exemplary embodiment, the camera 110 and the adapter 120 can be integrated. For example, a CPU included in the camera 110 can execute the processing performed by the signal generation unit 201 in FIG. 2 and the processing performed by the separation unit 203 in FIG. 2.

Further, while the case in which one camera 110 and one adapter 120 are connected on a one-to-one basis is mainly described in the present exemplary embodiment, the connection form is not limited to that described above. Alternatively, one adapter 120 can be connected to two cameras 110. In this manner, various modifications can be made to the configurations according to the present exemplary embodiment.

As described above, according to the exemplary embodiment of the present disclosure, the amount of data transmitted among devices in a system configured to generate virtual viewpoint images using captured images of a plurality of viewpoints is reduced.

Other Embodiments

An exemplary embodiment of the present disclosure is also realized by a process of supplying a program for realizing one or more functions of the above-described exemplary embodiment to a system or apparatus via a network or storage medium and causing one or more processors of a computer of the system or apparatus to read and execute the program. Further, an exemplary embodiment of the present disclosure is also realized by a circuit (e.g., application-specific integrated circuit (ASIC)) configured to realize one or more functions.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2016-218966, filed Nov. 9, 2016, which is hereby incorporated by reference herein in its entirety.

What is claimed is:

1. An image processing apparatus comprising:
one or more memories storing instructions; and
one or more processors executing the instructions to:
generate a first image by performing projective transformation on an image captured by a first image capturing apparatus, the first image being an image corresponding to an imaging direction of a second image capturing apparatus which performs image capturing from an imaging direction different from that of the first image capturing apparatus;
receive a second image captured by the second image capturing apparatus;
receive a first difference image which is a difference image based on a difference between the second image and a third image by performing projective transformation on an image captured by a third image capturing apparatus which performs image capturing from an imaging direction different from that of the first image capturing apparatus and that of the second image capturing apparatus, the third image being an image corresponding to the imaging direction of the second image capturing apparatus;

generate a second difference image which is a difference image based on a difference between the first image and the second image; and generate a foreground image base on the first difference image and the second difference image, the foreground image being used for generating a virtual viewpoint image.

2. The image processing apparatus according to claim 1, wherein the foreground image is transmitted to another first image processing apparatus connected to the image processing apparatus.

3. The image processing apparatus according to claim 1, wherein the second image and the first difference image are received from another second image processing apparatus connected to the image processing apparatus.

4. The image processing apparatus according to claim 1, wherein the second image and the first difference image are received from another second image processing apparatus which is daisy-chain connected to the image processing apparatus.

5. The image processing apparatus according to claim 1, wherein the first or second difference image is a binary image.

6. The image processing apparatus according to claim 1, wherein the second difference image is transmitted to another first image processing apparatus.

7. The image processing apparatus according to claim 1, wherein the foreground image represents a region corresponding to a foreground candidate region which is an overlap between the first difference image and the second difference image.

8. An image processing apparatus comprising:
one or more memories storing instructions; and
one or more processors executing the instructions to:
receive a first image captured by a first image capturing apparatus;
receive a second image captured by a second image capturing apparatus which performs image capturing from an imaging direction different from that of the first image capturing apparatus;
generate a third image by performing projective transformation on the second image, the third image being an image corresponding to an imaging direction of the first image capturing apparatus; and
transmit the first image and a first difference image to another image processing apparatus configured to generate an image used for generating a virtual viewpoint image, based on the first image, the first difference image, and a fourth image captured by a third image capturing apparatus which performs image capturing from an imaging direction different from that of the first image capturing apparatus and that of the second image capturing apparatus.

9. A method of processing an image, the method comprising:
generating a first image by performing projective transformation on an image captured by a first image capturing apparatus, the first image being an image corresponding to an imaging direction of a second image capturing apparatus which performs image capturing from an imaging direction different from that of the first image capturing apparatus;

receiving a second image captured by the second image capturing apparatus;
receiving a first difference image which is a difference image based on a difference between the second image and a third image by performing projective transformation on an image captured by a third image capturing apparatus which performs image capturing from an imaging direction different from that of the first image capturing apparatus and that of the second image capturing apparatus, the third image being an image corresponding to the imaging direction of the second image capturing apparatus;
generating a second difference image which is a difference image based on a difference between the first image and the second image; and
generating a foreground image base on the first difference image and the second difference image, the foreground image being used for generating a virtual viewpoint image.

10. A non-transitory storage medium storing a program for causing a computer of an image processing apparatus to:
generate a first image by performing projective transformation on an image captured by a first image capturing apparatus, the first image being an image corresponding to an imaging direction of a second image capturing apparatus which performs image capturing from an imaging direction different from that of the first image capturing apparatus;
receive a second image captured by the second image capturing apparatus;
receive a first difference image which is a difference image based on a difference between the second image and a third image by performing projective transformation on an image captured by a third image capturing apparatus which performs image capturing from an imaging direction different from that of the first image capturing apparatus and that of the second image capturing apparatus, the third image being an image corresponding to the imaging direction of the second image capturing apparatus;
generate a second difference image which is a difference image based on a difference between the first image and the second image; and
generate a foreground image based on the first difference image and the second difference image, the foreground image being used for generating a virtual viewpoint image.

11. A non-transitory storage medium storing a program for causing a computer of an image processing apparatus to:
receive a first image captured by a first image capturing apparatus;
receive a second image captured by a second image capturing apparatus which performs image capturing from an imaging direction different from that of the first image capturing apparatus;
generate a third image by performing projective transformation on the second image, the third image being an image corresponding to an imaging direction of the first image capturing apparatus;
generate a first difference image which is a difference image based on a difference between the first image and the third image; and
transmit the first image and a first difference image to another image processing apparatus configured to generate an image used for generating a virtual viewpoint image, based on the first image, the first difference image, and a fourth image captured by a third image capturing apparatus which performs image capturing from an imaging direction different from that of the first image capturing apparatus and that of the second image capturing apparatus.

* * * * *